(12) United States Patent
Yang et al.

(10) Patent No.: US 9,466,121 B2
(45) Date of Patent: Oct. 11, 2016

(54) DEVICES AND METHODS FOR AUGMENTED REALITY APPLICATIONS

(71) Applicant: QUALCOMM Incorporated, San Diego, CA (US)

(72) Inventors: Ruiduo Yang, San Diego, CA (US); Ning Bi, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 932 days.

(21) Appl. No.: 13/651,098

(22) Filed: Oct. 12, 2012

(65) Prior Publication Data

US 2014/0071241 A1    Mar. 13, 2014

Related U.S. Application Data

(60) Provisional application No. 61/699,615, filed on Sep. 11, 2012.

(51) Int. Cl.
     *H04N 13/02*      (2006.01)
     *G06T 1/00*      (2006.01)
     *G06T 7/20*      (2006.01)

(52) U.S. Cl.
     CPC ... *G06T 7/2053* (2013.01); *G06T 2207/20144* (2013.01)

(58) Field of Classification Search
None
See application file for complete search history.

(56) References Cited

U.S. PATENT DOCUMENTS

| | | | |
|---|---|---|---|
| 5,668,605 A * | 9/1997 | Nachshon | H04N 5/272 348/584 |
| 7,348,963 B2 | 3/2008 | Bell | |
| 7,868,922 B2 * | 1/2011 | Ciuc | G06T 7/0081 348/222.1 |
| 2008/0175477 A1 * | 7/2008 | Ohk | G06K 9/38 382/176 |
| 2008/0240500 A1 * | 10/2008 | Huang | G06K 9/38 382/103 |
| 2010/0287511 A1 | 11/2010 | Meier et al. | |
| 2010/0289817 A1 | 11/2010 | Meier et al. | |
| 2010/0321490 A1 | 12/2010 | Chen et al. | |
| 2011/0063415 A1 * | 3/2011 | Gefen | H04N 5/4403 348/43 |
| 2011/0242345 A1 * | 10/2011 | O'Gorman | G06F 21/6263 348/222.1 |
| 2012/0075440 A1 | 3/2012 | Ahuja et al. | |
| 2012/0113092 A1 | 5/2012 | Bar-Zeev et al. | |
| 2012/0116728 A1 | 5/2012 | Shear et al. | |

FOREIGN PATENT DOCUMENTS

WO      2013032041 A1      3/2013

OTHER PUBLICATIONS

International Search Report and Written Opinion for the International Application No. PCT/US2013/054423, ISA/EPO, Date of Mailing Jul. 4, 2014, 15 pages.

(Continued)

*Primary Examiner* — Andy Rao
*Assistant Examiner* — Tyler Edwards
(74) *Attorney, Agent, or Firm* — Toler Law Group, PC

(57) ABSTRACT

In a particular embodiment, a method includes evaluating, at a mobile device, a first area of pixels to generate a first result. The method further includes evaluating, at the mobile device, a second area of pixels to generate a second result. Based on comparing a threshold with a difference between the first result and the second result, a determination is made that the second area of pixels corresponds to a background portion of a scene or a foreground portion of the scene.

52 Claims, 12 Drawing Sheets

(56) References Cited

OTHER PUBLICATIONS

Grabner H., et al., "Autonomous Learning of a Robust Background Model for Change Detection", 2006, XP055086628, retrieved from the Internet: <URL: http://citeseerx.ist.psu.edu/viewdoc/summary?doi=10.1.1.144.7909>, [retrieved on Nov. 4, 2013], 10 pages.

Partial International Search Report and Written Opinion, PCT/US2013/054423, ISA/EPO, Nov. 14, 2013, 6 pages.

Comport, et al., "Real-time Markerless Tracking for Augmented Reality: The Virtual Visual Servoing Framework," IEEE Transactions on Visualization and Computer Graphics, Jul. 2006, pp. 615-628.

Sauer, Markus, "Occlusion Handling in Augmented Reality User Interfaces for Robotic Systems," Robotics (ISR), 2010 41st International Symposium on and 2010 6th German Conference on Robotics (ROBOTIK), Jun. 2010, pp. 177-183.

Skoczewski et al., "Augmented Reality System for Accelerometer Equipped Mobile Devices," 2010 IEEE/ACIS 9th International Conference on Computer and Information Science (ICIS), Aug. 2010, pp. 209-214.

Sheikh, et al. "Background Subtraction for Freely Moving Cameras", 2009 IEEE 12th International Conference on Computer Vision, Sep. 29-Oct. 2, 2009, 7 pp.

Xiong, et al. "Efficient Block Matching Motion Estimation Using Multilevel Intra-and Inter-Subblock Features—Subblock-Based SATD", IEEE Transactions on Evolutionary Computation, vol. 19, No. 7, Jul. 2009, pp. 1039-1043.

Saenz, Aaron, "New Augmented Reality Software Removes Objects from Video Feeds in Realtime" from Singularity HUB—Nov. 5, 2012, viewed at http://singularityhub.com/2010/11/05/new-augmented-reality-software-removes-objects-from-video-feeds-in-realtime/, 5 pp.

Davies, Chris "Sony SmartAR Offers Augmented Reality Without Marker Glyphs", from SlashGear—Feeding Your Gadget and Tech Obsessions—May 23, 2011, viewed at http://www.slashgear.com/sony-smartar-offers-augmented-reality-without-marker-glyphs-video-23153587/, 12 pp.

* cited by examiner

DEVICES AND METHODS FOR AUGMENTED REALITY APPLICATIONS

I. CROSS-REFERENCE TO RELATED APPLICATIONS

The present application claims the benefit of U.S. Provisional Patent Application No. 61/699,615, filed Sep. 11, 2012, the disclosure of which is incorporated by reference herein in its entirety.

II. FIELD

The present disclosure is generally related to augmented reality applications for mobile devices.

III. DESCRIPTION OF RELATED ART

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and internet protocol (IP) telephones, can communicate voice and data packets over wireless networks. Further, many such wireless telephones include other types of devices that are incorporated therein. For example, a wireless telephone can also include a digital still camera, a digital video camera, a digital recorder, and an audio file player. Also, such wireless telephones can process executable instructions, including software applications, such as a web browser application, that can be used to access the Internet. As such, these wireless telephones can include significant computing capabilities.

Some electronic devices use augmented reality applications to add computer-generated images to reality-based images or video. For example, when a camera of a mobile device is pointed at a target area, a game might reproduce an image of the target area on a display of the mobile device while augmenting the image by adding a computer-generated "virtual" object. Such applications may consume significant processing resources of the electronic device and may present challenges for detection of interaction between the user and the virtual object.

Some electronic devices utilize "markers" to enable location detection. For example, a user of a mobile device may print an image having a size and pattern recognizable by an application of the mobile device. When a camera of the mobile device is pointed at the marker, the application may "view" the marker to estimate the distance between the marker and the mobile device. However, using such markers may be inconvenient and bothersome for users. In addition, because the mobile device may be moving with respect to the marker while the application is being processed, the mobile device may need to repetitively reevaluate the marker to re-estimate the location of the ground or other surface.

IV. SUMMARY

A mobile device in accordance with the present disclosure may utilize one or more techniques to enable efficient processing of augmented reality applications. In at least some embodiments, the one or more techniques enable interactions between a user and a "virtual object" without utilizing a marker. For example, the mobile device may use an integral image technique to efficiently segment (e.g., subtract) a background associated with an image to be displayed. As another example, the mobile device may utilize sensor data to determine a location of a ground surface relative to the mobile device, thus enabling placement of virtual objects on a ground surface without use of a marker. As another example, the mobile device may use a stereo camera to determine depth information (e.g., a depth profile) associated with a scene of interest. The depth information may be used to determine a position of the virtual object (e.g., whether the virtual object is displayed in front of or occluded by a foreground object).

In a particular embodiment, a method includes evaluating, at a mobile device, a first area of pixels to generate a first result. The method further includes evaluating, at the mobile device, a second area of pixels to generate a second result. Based on comparing a threshold with a difference between the first result and the second result, a determination is made that the second area of pixels corresponds to a background portion of a scene or a foreground portion of the scene.

In another particular embodiment, a mobile device includes an evaluator configured to evaluate a first area of pixels to generate a first result. The evaluator is further configured to evaluate a second area of pixels to generate a second result. The mobile device further includes logic configured to determine that the second area of pixels corresponds to a background portion of a scene or a foreground portion of the scene based on comparing a threshold with a difference between the first result and the second result.

In another particular embodiment, a mobile device includes means for evaluating a first area of pixels to generate a first result and further for evaluating a second area of pixels to generate a second result. The mobile device further includes means for determining that the second area of pixels corresponds to a background portion of a scene or a foreground portion of the scene based on comparing a threshold with a difference between the first result and the second result.

In another particular embodiment, a computer-readable non-transitory medium stores instructions executable by a processor of a mobile device to evaluate, at the mobile device, a first area of pixels to generate a first result and to evaluate, at the mobile device, a second area of pixels to generate a second result. The instructions are further executable by the processor to determine that the second area of pixels corresponds to a background portion of a scene or a foreground portion of the scene based on comparing a threshold with a difference between the first result and the second result.

In another particular embodiment, a method includes determining, using a sensor of a mobile device, an angle of a longitudinal extent of the mobile device with respect to a ground surface. The method further includes estimating a first distance with respect to the ground surface. The first distance is associated with a first projection from a center of the mobile device to the ground surface, where the first projection is perpendicular to the longitudinal extent of the mobile device. A second distance is estimated based on the angle and the first distance. The second distance is associated with a second projection from the center of the mobile device to the ground surface, where the second projection is perpendicular to the ground surface.

In another particular embodiment, a mobile device includes a sensor configured to determine an angle of a longitudinal extent of the mobile device with respect to a ground surface. The mobile device further includes an estimator. The estimator estimates a first distance associated with a first projection from a center of the mobile device to the ground surface, where the first projection is perpendicular to the longitudinal extent of the mobile device. The estimator further estimates, based on the angle and the first distance, a second distance associated with a second projection from the center of the mobile device to the ground surface. The second projection is perpendicular to the ground surface.

In another particular embodiment, a mobile device includes means for determining an angle of a longitudinal extent of the mobile device with respect to a ground surface. The mobile device further includes means for estimating a first distance and for estimating a second distance based on the angle and the first distance. The first distance is associated with a first projection from a center of the mobile device to the ground surface, where the first projection is perpendicular to the longitudinal extent of the mobile device. The second distance is associated with a second projection from the center of the mobile device to the ground surface. The second projection is perpendicular to the ground surface.

In a particular embodiment, a computer-readable non-transitory medium stores instructions executable by a processor of a mobile device to determine, using a sensor of the mobile device, an angle of a longitudinal extent of the mobile device with respect to a ground surface. The instructions are further executable by the processor to estimate a first distance and to estimate a second distance based on the angle and the first distance. The first distance is associated with a first projection from a center of the mobile device to the ground surface, where the first projection is perpendicular to the longitudinal extent of the mobile device. The second distance is associated with a second projection from the center of the mobile device to the ground surface. The second projection is perpendicular to the ground surface.

One particular advantage provided by at least one of the disclosed embodiments is efficient identification of foreground and background portions of an image. For example, according to at least one illustrative embodiment, a mobile device uses a pixel intensity sum technique, such as an integral image technique, to efficiently identify foreground and background portions of the image. Further, at least some of the disclosed embodiments enable use of augmented reality applications that do not require use of a marker, thereby making the augmented reality applications more convenient for users.

Other aspects, advantages, and features of the present disclosure will become apparent after review of the entire application, including the following sections: Brief Description of the Drawings, Detailed Description, and the Claims.

V. BRIEF DESCRIPTION OF THE DRAWINGS

VI. DETAILED DESCRIPTION

Figure 1:
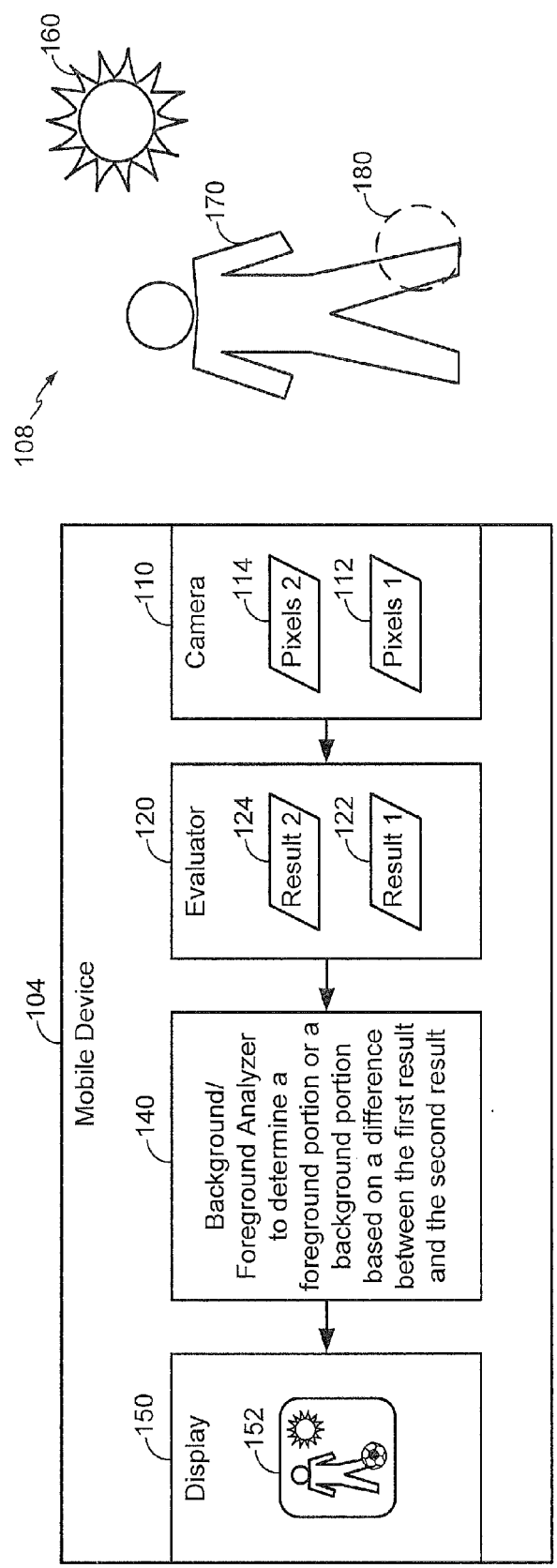
FIG. 1 is a diagram of a particular embodiment of a scene and a mobile device to generate an image of the scene.

FIG. 1 depicts a particular illustrative embodiment of a mobile device 104 and a scene 108. In the particular example of FIG. 1, the mobile device 104 includes a camera 110, an evaluator 120, a background/foreground analyzer 140, and a display 150. The scene 108 may include a background object 160, a foreground object 170, and a location 180. The location 180 may correspond to a virtual object to be displayed at the display 150, for example in connection with an augmented reality application, as described further below with reference to operation of the display 150. For example, the display 150 may display an image 152 that corresponds to the scene 108.

In operation, the camera 110 may capture images of the scene 108. For example, the camera 110 may generate a first area of pixels 112 (e.g., a plurality of pixels, such as a matrix or a table) at a first time. As another example, the camera 110 may generate a second area of pixels 114 at a different time than the first time (e.g., at a second time subsequent to the first time). The first area of pixels 112 may be associated with an orientation (e.g., positioning) of the mobile device 104 and the scene 108 at the first time. The second area of pixels 114 may be associated with an orientation (e.g., positioning) of the mobile device 104 and the scene 108 at the second time. In at least one embodiment, the areas of pixels 112, 114 are each used to determine a background portion of the image 152 corresponding to the background object 160, as described further below with reference to at least FIG. 2A. In at least another embodiment, one or more of the areas of pixels 112, 114 are used to determine a foreground portion of the image 152 corresponding to the foreground object 170, as described further below with reference to at least FIGS. 2B and 2C.

The evaluator 120 may evaluate the first area of pixels 112 according to an operation to generate a first result 122. In at least one embodiment, the operation is a pixel intensity sum operation that sums pixel intensities of the first area of pixels 112. For example, the operation may be an integral image operation (also known as a summed area operation) and the first result 122 may be an integral image (also known as a summed area table) associated with the first area of pixels 112. The integral image at position (in, n) of the first area of pixels 112 may be:

$$\sum_{x \leq m; y \leq n} I(x, y),$$

where I(x, y) is a pixel intensity value having position (x, y) in the first area of pixels 112. Accordingly, the integral image operation may generate a plurality of values (e.g., a table) in which each value has a position corresponding to a particular pixel of the first area of pixels 112 and indicates a sum of those pixel intensity values of the first area of pixels 112 "up and to the left" of the particular pixel (including the particular pixel). To further illustrate, examples of particular integral image operations are described further with reference to FIGS. 2A-2C. The evaluator 120 may also evaluate the second area of pixels 114 according to the operation to generate a second result 124. The second result 124 may be an integral image associated with the second area of pixels 114.

The background/foreground analyzer 140 may be responsive to the evaluator 120. In a particular embodiment, the background/foreground analyzer 140 compares results, such as the results 122, 124, to generate one or more of a background portion of the image 152 and a foreground portion of the image 152. For example, the background/foreground analyzer 140 may compare the results 122, 124 to determine a difference between the results 122, 124. In at least one embodiment, the background/foreground analyzer 140 compares the difference to a threshold (e.g., a predetermined threshold) to determine whether the result 124 corresponds to one or more of the background object 160 and the foreground object 170. In at least one embodiment, the threshold used is a percentage (e.g., a percentage difference between the results 122, 124).

The threshold used by the background/foreground analyzer 140 may be determined by the particular context and application (e.g., may be determined experimentally). In at least one embodiment, the threshold is "adaptive" relative to the images being captured. For example, when a background and a foreground are more different (e.g., when the foreground and background are of different colors), then the threshold may be increased. When the background and foreground are less different (e.g., when the background and foreground are of similar colors), then the threshold may be decreased. In a particular illustrative embodiment, the threshold is variable between a "minimum" value and a "maximum" value, such as between 1 and 255 (e.g., the threshold may be set to 20). Accordingly, the background/foreground analyzer 140 may track differences between foregrounds and backgrounds and adjust the threshold accordingly. The background/foreground analyzer 140 may also utilize multiple thresholds, such as a first or "background" threshold used for determining a background portion of the image 152 and a second or "foreground" threshold for determining a foreground portion of the image 152, as described further with reference to FIGS. 2A-2C.

To further illustrate by way of a particular example, if the first area of pixels 112 corresponds to a first region of the scene 108 (e.g., one of a plurality of regions of an image captured by the camera 110) at a first time and the second area of pixels 114 corresponds to the first region of the scene at a second time, then if the difference is determined to be low (e.g., does not exceed the threshold), the first region of the scene may be determined to be relatively stationary or stable between the first time and the second time. The first region of the scene 108 may be a selected portion of a captured image and the selected portion may be changed during operation to evaluate each portion of the captured image. Accordingly, the first region may be identified as a background portion (e.g., as a portion of the background object 160) of the scene 108. An example of such a stationary object may be the sun depicted in FIG. 1. If the difference is determined to be high (e.g., exceeds the threshold), then the first region of the scene 108 may be determined to have moved or changed between the first time and the second time. Accordingly, the first region may be identified as a foreground portion (e.g., as a portion of the foreground object 170) of the scene 108. A user engaged in a game of "virtual soccer" (e.g., in connection with an augmented reality game) is an example of an application in which a foreground object may exhibit movement that may exceed the threshold.

The foregoing technique to identify foreground and background portions of an image described with reference to the first region may also be applied to one or more additional regions of the scene, serially or in parallel, to identify foreground and background portions of the entire scene. In at least one embodiment, each region of a captured image of the scene 108 may be compared to a corresponding region of at least one prior captured image of the scene 108 in order to identify background and/or foreground portions of a captured image.

The display 150 may be responsive to the background/foreground analyzer 140 to display the image 152. The image 152 may correspond to the scene 108. For example, in the particular illustration of FIG. 1, the image 152 includes a background portion (i.e., the sun) corresponding to the background object 160, a foreground portion (i.e., a user) corresponding to the foreground object 170, and a virtual object (i.e., a ball generated in connection with an augmented reality application, such as a game) corresponding to the location 180. Example operations of the mobile device 104 are described further with reference to FIGS. 2A-2C.

It will be appreciated that the foregoing techniques described with reference to FIG. 1 may enable simplified background/foreground analysis for the mobile device 104. For example, object motion may be determined based on a degree of change of pixel intensities in a region of an image. By use of the above method, the mobile device 104 may avoid repetitively reevaluating orientation and location data while the mobile device 104 is in motion and is processing an augmented reality application. Accordingly, computational efficiency of background/foreground analysis is improved.

Figure 2A:
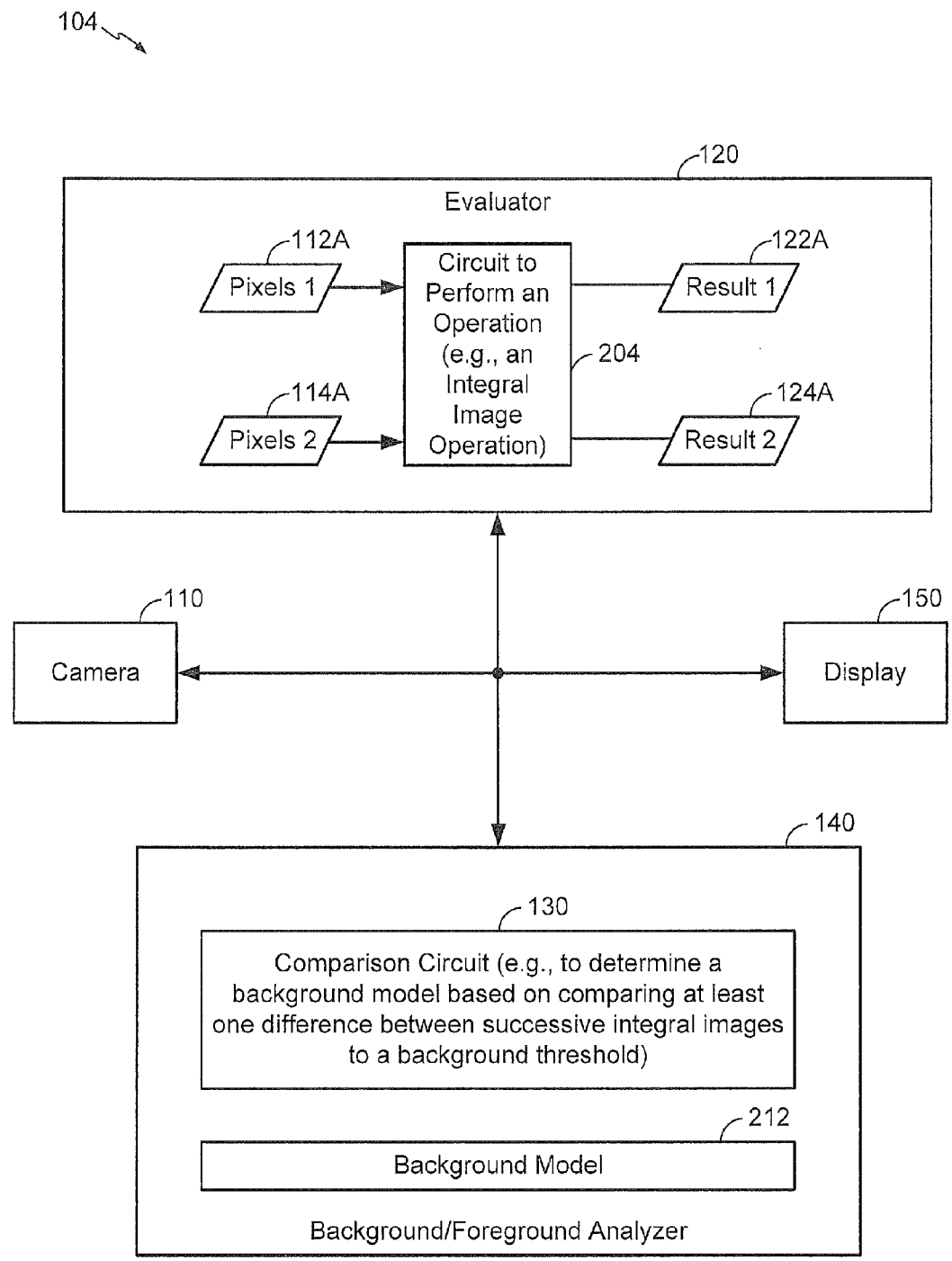
FIG. 2A is a block diagram of a particular embodiment of the mobile device of FIG. 1.

FIG. 2A depicts a particular illustrative embodiment of the mobile device 104 described with reference to FIG. 1. Various components and functionalities of the mobile device 104 of FIG. 2A may be described with reference to FIG. 1. For example, the mobile device 104 of FIG. 2A may include the camera 110, the evaluator 120, the background/foreground analyzer 140, and the display 150. In the particular example of FIG. 2A, the evaluator 120 includes a circuit 204 to perform an operation, such as an integral image operation, as explained further below. Further, in the particular example of FIG. 2A, the background/foreground analyzer 140 includes a comparison circuit 130, which may be configured to determine a background model 212 based on comparing at least one difference between successive integral images to a background threshold, as explained further below.

In operation, the evaluator 120 may be responsive to a first area of pixels 112A and to a second area of pixels 114A each generated by the camera 110. For example, the circuit 204 may perform an operation based on the areas of pixels 112A, 114A to generate a first result 122A and a second result 124A, respectively. In at least one embodiment, the areas of pixels 112A, 114A and the results 122A, 124A correspond to the areas of pixels 112, 114 and the results 122, 124 of FIG. 1, respectively. In at least one embodiment, the operation performed by the circuit 204 is an integral image operation, the first result 122A is an integral image associated with the first area of pixels 112A, and the second result 124A is an integral image associated with the second area of pixels 114A. To illustrate, if the first area of pixels 112A is represented by a matrix of pixel intensity values, the integral image at position (m, n) of the first area of pixels 112A is $$\sum_{x \leq m; y \leq n} I(x, y),$$

where I(x, y) is a pixel intensity value having position (x, y) in the matrix of pixel intensity values. For example, for a matrix of pixel intensity values 3 5 1
1 2 1
4 2 4 that is input to the circuit 204, the circuit 204 may determine the corresponding integral image to be:

3 8 9
4 11 13
8 17 23

In at least one embodiment, the background/foreground analyzer 140 is responsive to results (e.g., the results 122A, 124A) output by the circuit 204 to generate the background model 212. According to one example, the comparison circuit 130 may determine a difference between the results 122A, 124A. If the difference does not exceed a threshold associated with determining background models (i.e., a "background threshold"), then a determination may be made that the areas of pixels 112A, 114A represent a substantially "stable" or "steady" image of a scene (e.g., the background object 160 of the scene 108 of FIG. 1). Upon acquiring the substantially "stable" or "steady" image, one or more of the areas of pixels 112A, 114A and the results 122A, 124A may be used to construct the background model 212, to render a background portion at the display 150 using the background model 212 (e.g., in connection with an augmented reality application), or a combination thereof.

Figure 2B:
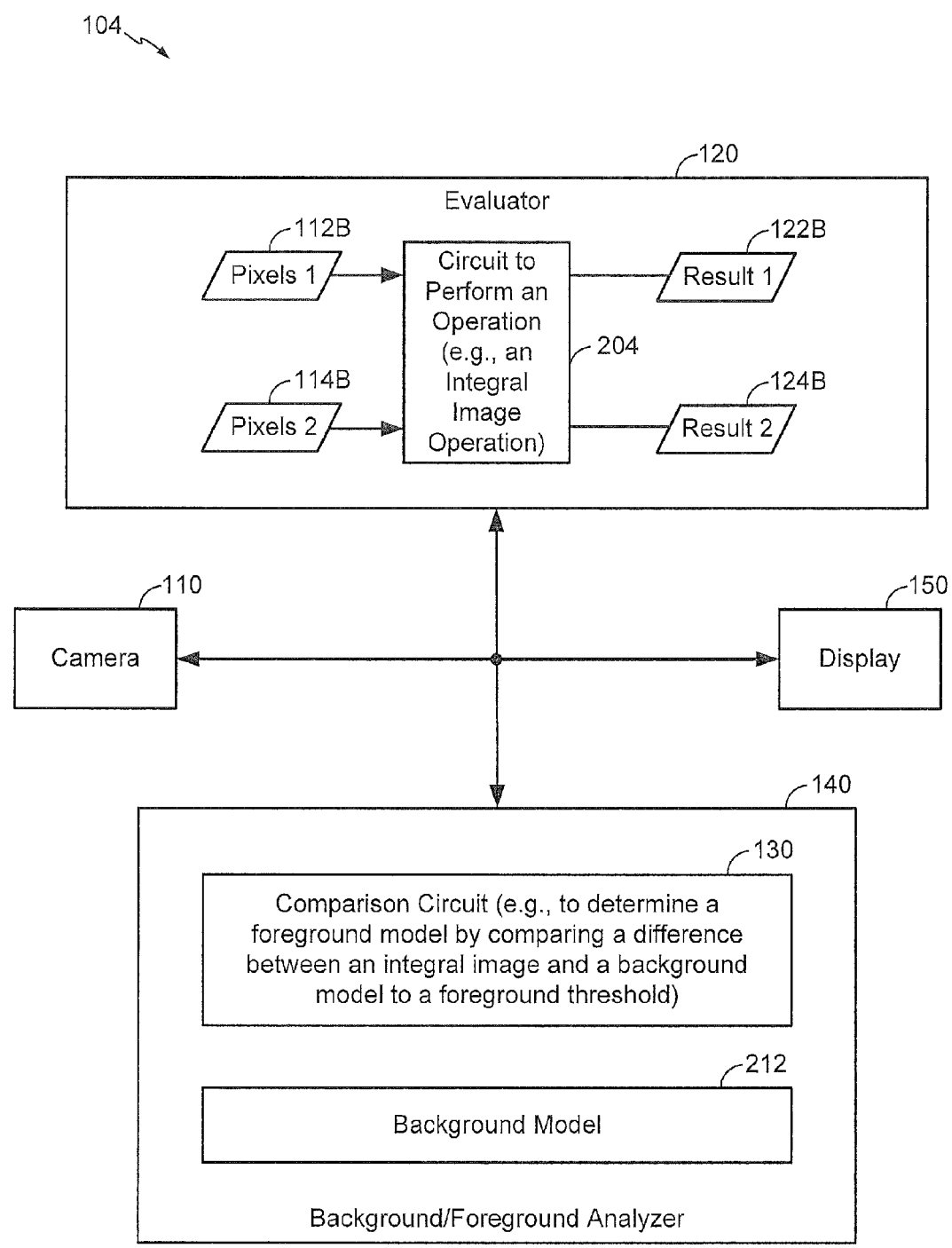
FIG. 2B is a block diagram of another particular embodiment of the mobile device of FIG. 1.
Figure 2C:
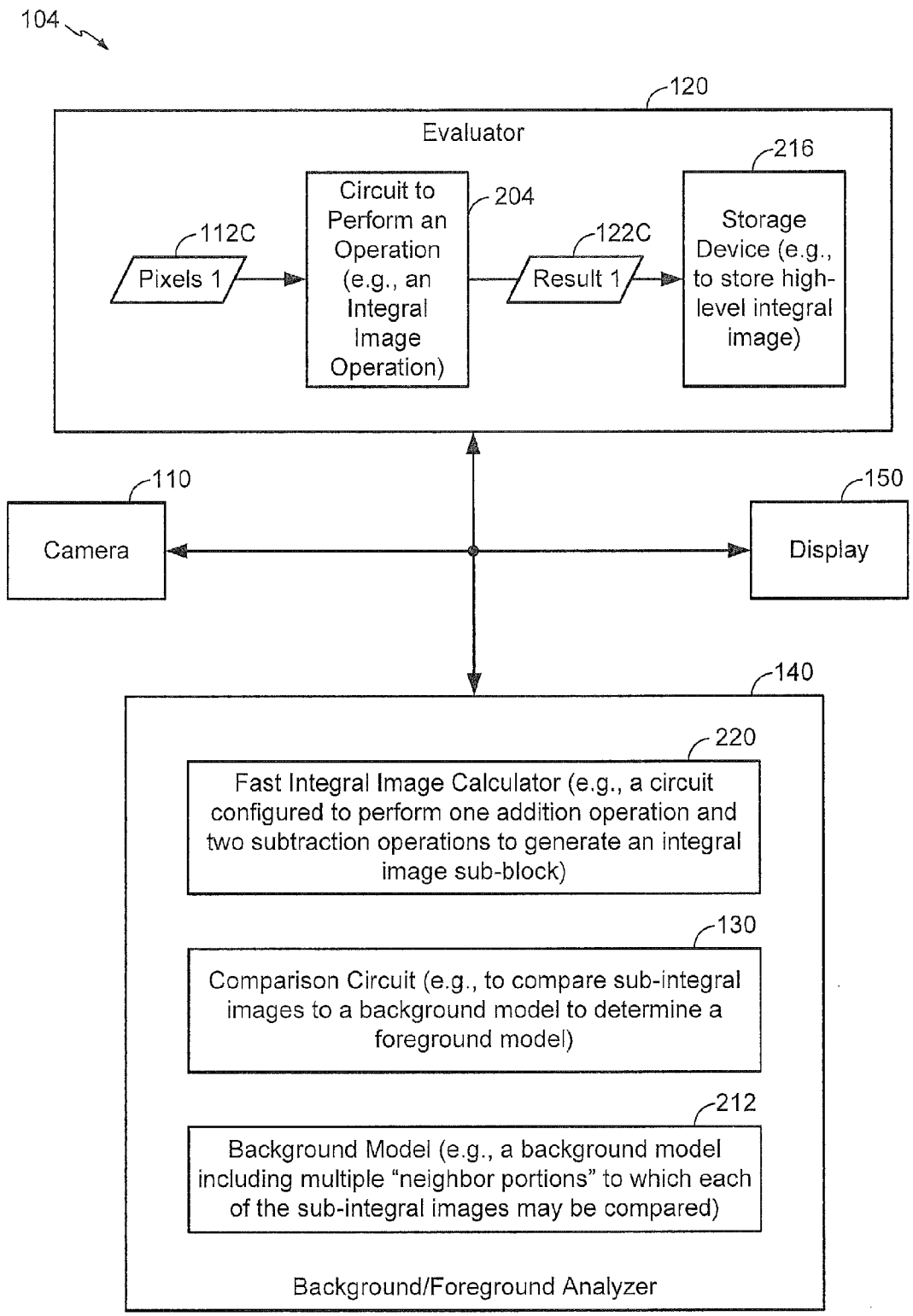
FIG. 2C is a block diagram of another particular embodiment of the mobile device of FIG. 1.

In at least one embodiment, the background model 212 is stored at the mobile device 104 (e.g., stored by the background/foreground analyzer 140, as depicted in the example of FIG. 2A) and used in subsequent calculations, as described further with reference to at least FIGS. 2B and 2C. For example, the result 124A may be stored at the mobile device 104 (e.g., as part of a background model, such as the background model 212) and is used to determine a foreground portion of an image, as described further with reference to at least FIGS. 2B and 2C. According to further embodiments, background models may be sent and received by mobile devices, such as the mobile device 104 of FIG. 2A. According to still further embodiments, alternatively or in addition to the foregoing techniques, background models may be generated based on a "user designation" technique, as described further with reference to FIG. 8.

Figure 9:
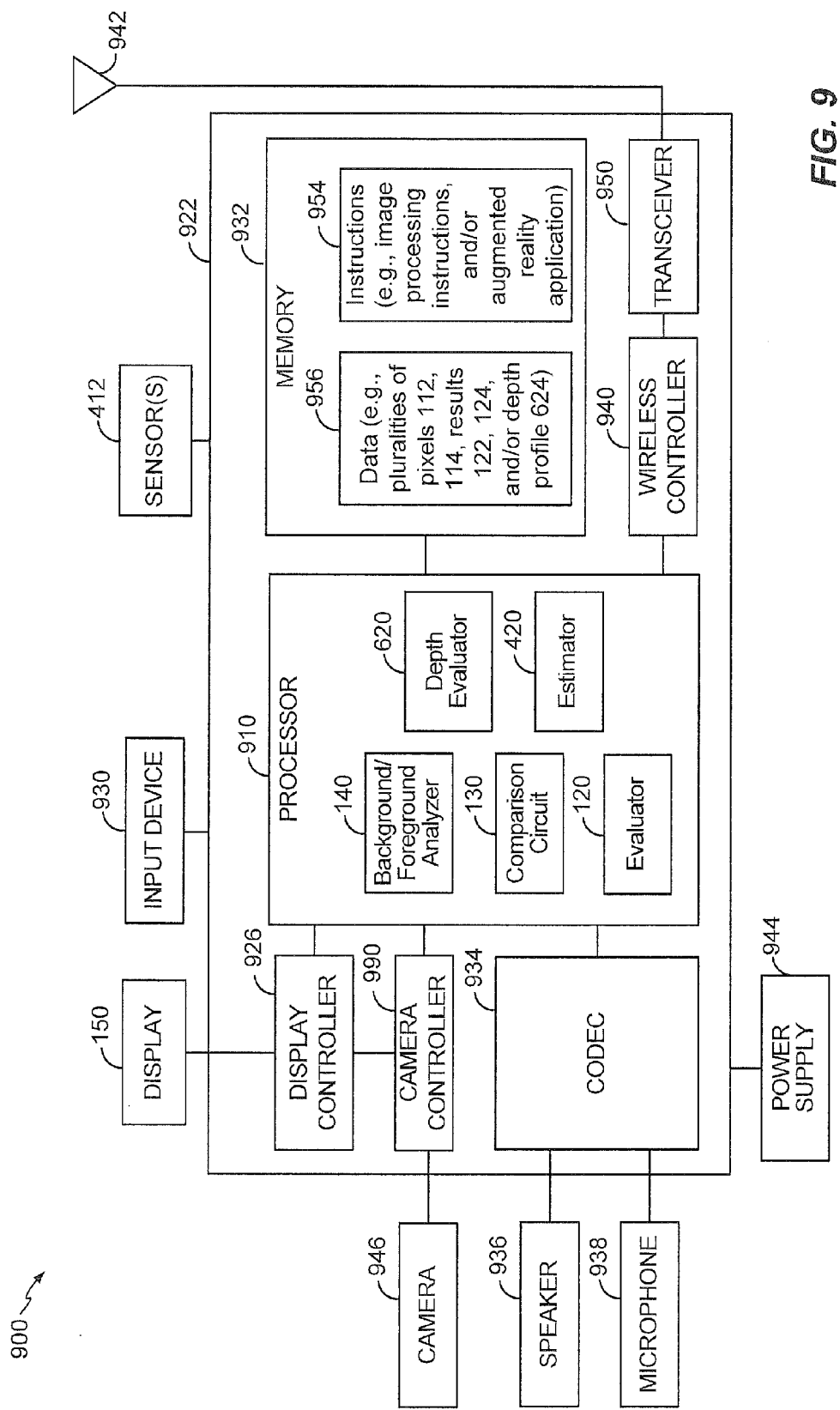
FIG. 9 is a block diagram of a particular embodiment of a mobile device, such as the mobile device of one or more of FIGS. 1, 2A-2C, 4, and 6, or a combination thereof.

If the difference exceeds the threshold, then a determination may be made that the areas of pixels 112A, 114A do not represent a substantially "stable" or "steady" image of the scene, and additional images of the scene may be captured (e.g., by sending a signal to the camera 110 (or to a camera controller associated with the camera 110, as described further with reference to FIG. 9), and the additional images analyzed until a substantially "stable" or "steady" set of pixels (e.g., background model) is obtained.

In a particular embodiment, in response to the background/foreground analyzer 140 determining that the difference is greater than or equal to the threshold, the background/foreground analyzer 140 may determine that the second area of pixels 114A corresponds to a foreground portion. Determination of foreground portions is described further with reference to at least FIGS. 2B and 2C.

It will be appreciated that the integral image technique described with reference to FIG. 2A is computationally robust and may enable simplified background/foreground analysis for the mobile device 104. For example, object motion may be determined based on a degree of change of pixel intensities in a region of an image (e.g., whether the degree of change exceeds a threshold) instead of based on a location and position of a marker. Because the mobile device 104 of FIG. 2A may avoid repetitively reevaluating orientation and location of the marker while the mobile device is in motion and while processing an augmented reality application, computational complexity of generating the background model 212 may be reduced.

FIG. 2B depicts a particular illustrative embodiment of the mobile device 104 described with reference to FIG. 1. Various components and functionalities of the mobile device 104 of FIG. 2B may be described with reference to FIGS. 1 and 2A. For example, the mobile device 104 of FIG. 2B may include the camera 110, the evaluator 120, the background/foreground analyzer 140, and the display 150. In the particular example of FIG. 2B, the evaluator 120 includes the circuit 204 of FIG. 2A. Further, in the particular example of FIG. 2B, the background/foreground analyzer 140 includes the comparison circuit 130 of FIG. 2A, which may be configured to determine a foreground/background portion by comparing a difference between an integral image and a background model to a foreground threshold, as explained further below.

In operation, the evaluator 120 may be responsive to a first area of pixels 112B and to a second area of pixels 114B, each generated by the camera 110. For example, the circuit 204 may perform an operation based on the areas of pixels 112B, 114B to generate a first result 122B and a second result 124B, respectively. In at least one embodiment, the areas of pixels 112B, 114B and the results 122B, 124B correspond to the areas of pixels 112, 114 and the results 122, 124 of FIG. 1, respectively. In at least one embodiment, the operation performed by the circuit 204 is an integral image operation, the first result 122B is an integral image associated with the first area of pixels 112B, and the second result 124B is an integral image associated with the second area of pixels 114B.

In at least one embodiment, the comparison circuit 130 of FIG. 2B is configured to compare results of operations (e.g., the results 122B, 124B) to the background model 212 to determine foreground models. For example, according to a particular illustrative embodiment, the comparison circuit 130 may compare the first result 122B to the background model 212 (or to a portion of the background model 212) to determine a first difference (e.g., a difference between two image integrals). If the first difference does not exceed a threshold associated with foreground models (i.e., a "foreground threshold"), then the background/foreground analyzer 140 may determine, based on the first difference, that the first result 122B does not correspond to a foreground portion of a scene (e.g., the foreground object 170 of the scene 108 of FIG. 1, or a portion thereof). That is, because the first difference indicates that the first result 122B is "similar" to or substantially "matches" the background model 212, the background/foreground analyzer 140 may determine that the first area of pixels 112B does not correspond to a foreground object of the scene (e.g., does not correspond to a "dynamic" object, such as a user in motion, or a portion thereof).

Continuing with the foregoing example, in response to determining that the first result 122B does not exceed the foreground threshold, the background/foreground analyzer 140 may cause the camera 110 to capture the second area of pixels 114B. The comparison circuit may be responsive to the second result 124B generated by the circuit 204 based on the second area of pixels 114B. The comparison circuit 140 may compare the second result 124B to the background model 212 to generate a second difference. If the second difference exceeds the foreground threshold, then the background/foreground analyzer 140 may determine, based on the second difference, that the second result 124B does not substantially "match" or is not "similar" to the background model 212. The background/foreground analyzer 140 may thus determine that the second area of pixels 114B corresponds to a foreground object of the scene (e.g., corresponds to a "dynamic" object, such as a user in motion, or a portion thereof). One or more of the second area of pixels 114B and the second result 124B may be used to render a representation of the foreground object at the display 150, for example in connection with an augmented reality application.

It will be appreciated that the techniques described in connection with FIG. 2B may enable simplified foreground model generation for a mobile device. For example, object motion may be determined based on a degree of change of pixel intensities in a region of an image (e.g., whether the degree of change exceeds a threshold) instead of based on a location and position of a marker. Because the mobile device may avoid repetitively reevaluating orientation and location of the marker while the mobile device is in motion and while processing an augmented reality application, computational complexity of background/foreground analysis may be reduced.

In at least one embodiment, in response to determining that the first difference does not exceed the threshold, the first result 122B may also be "subdivided" into portions (e.g., sub-blocks). One or more of the subdivided portions may be compared to the background model 212. Such techniques are described further with reference to at least FIG. 2C.

FIG. 2C depicts a particular illustrative embodiment of the mobile device 104 described with reference to FIG. 1. Various components and functionalities of the mobile device 104 of FIG. 2C may be described with reference to FIGS. 1, 2A, and 2C. For example, the mobile device 104 of FIG. 2C may include the camera 110, the evaluator 120, the background/foreground analyzer 140, and the display 150. In the particular example of FIG. 2C, the evaluator 120 includes the circuit 204 of FIGS. 2A and 2B and further includes a storage device 216. The background/foreground analyzer 140 may include the comparison circuit 130 of FIGS. 2A and 2B and may further include a fast integral image calculator 220. The fast integral image calculator 220 may include circuitry configured to perform a "fast integral image operation" using one addition operation and two subtraction operations, as described further below.

In operation, the camera 110 may capture images of a scene, such as the scene 108 of FIG. 1. For example, a first area of pixels 112C may correspond to an image of the scene captured at a first time. The circuit 204 may perform an operation on the first area of pixels 112C to generate a first result 122C. The first area of pixels 112C and the first result 122C may correspond to the first area of pixels 112 and the first result 122 of FIG. 1, respectively.

In a particular embodiment, the first area of pixels 112C corresponds to pixels of an entire image captured by the camera 110 and the first result 122C corresponds to an integral image associated with the entire image (e.g., the first result 122C may be a "high-level" integral image). The background/foreground analyzer 140 may be responsive to the high-level integral image generated by the circuit 204. In at least one embodiment, the fast integral image calculator 220 may divide the first result 122C into portions (e.g., sub-blocks) and calculate a respective integral image associated with each of the portions.

As an illustrative, non-limiting example, if the first area of pixels 112C is a four-by-four matrix:

3 5 1 1

1 2 1 1

4 2 4 1

1 1 1 1 then the circuit 204 may compute the first result 122C to be a "high-level" integral image associated with the four-by-four matrix:

3 8 9 10

4 11 13 15

8 17 23 26

9 19 26 30

The background/foreground analyzer 140 may compare the first result 122C to the background model 212 using an appropriate technique, such as one or more of the techniques described with reference to FIGS. 1, 2A, and 2B (e.g., using a threshold), to determine whether the first result 122C "matches" the background model 212. If the comparison circuit 130 does not determine that the first result 122C "matches" the background model 212, the fast integral image calculator 220 may generate one or more sub-portions or "sub-integral images" (e.g., an integral image of a subset of pixels of the first area of pixels 112C) based on the first result 122C and may compare the one or more sub-integral images to the background model 212. In a particular embodiment, the fast integral image calculator calculates the one or more sub-integral images according to:

a+d−b−c where d is the bottom-right value associated with a portion of the first result 122C for which a sub-integral image is to be calculated and a, b, and c are boundary values "outside" the portion of the first result 122C to the upper-left, upper-right, and lower-left of the portion, respectively. To further illustrate, continuing with the previous illustrative, non-limiting example, if the first result 122C is 3  8   9  10

4  11  13 15

8  17  23 26

9  19  26 30 then four two-by-two sub-integral images can each be determined based on the first result 122C, namely: 11+0−0−0=11, 15+0−0−11=4, 19+0−11−0=8, and 30+11−15−19=7 for the upper left, upper right, lower left, and lower right sub-integral images, respectively.

One or more such sub-integral images may be compared to the background model 212 to determine a "match." In a particular embodiment, the sub-integral images are compared to "neighbor portions" (e.g., portions within a predetermined range of the sub-integral images) of the background model 212. As an example, the "upper left" two-by-two sub-integral image may be compared the "upper left" two-by-two portion of the background model 212. If one or more of the sub-integral images match the background model 212, then the one or more sub-integral images may be determined to correspond to background. If none of the sub-integral images matches the background model 212, then the first result 122C can be further subdivided into smaller sub-integral images. As described further with reference to FIG. 3B, if none of the portions is determined to "match" the background model 212, then the first result 122C may be determined to correspond to a foreground portion (e.g., a "dynamic" object in motion).

It should be appreciated that the techniques described in connection with FIG. 2C may enable fast comparison of pixels (e.g., the first area of pixels 112C) with a background model (e.g., the background model 212). For example, in at least one embodiment, only a "high-level" integral image is stored (e.g., stored at the storage device 216), which may be used to generate any sub-integral images, such as using the fast integral image calculator 220. According to a particular illustrative embodiment, after generating the first result 122C, the first area of pixels 112C is not used for additional integral image generation (e.g., since sub-integral images may be generated based instead on the high-level integral image). Accordingly, due to the computationally efficient techniques described with reference to FIG. 2C (e.g., sub-integral image generation using one addition operation and two subtraction operations), augmented reality applications may be processed and results rendered (e.g., at the display 150) more rapidly, thus providing users of the mobile device 104 a more realistic augmented reality experience.

Figure 3A:
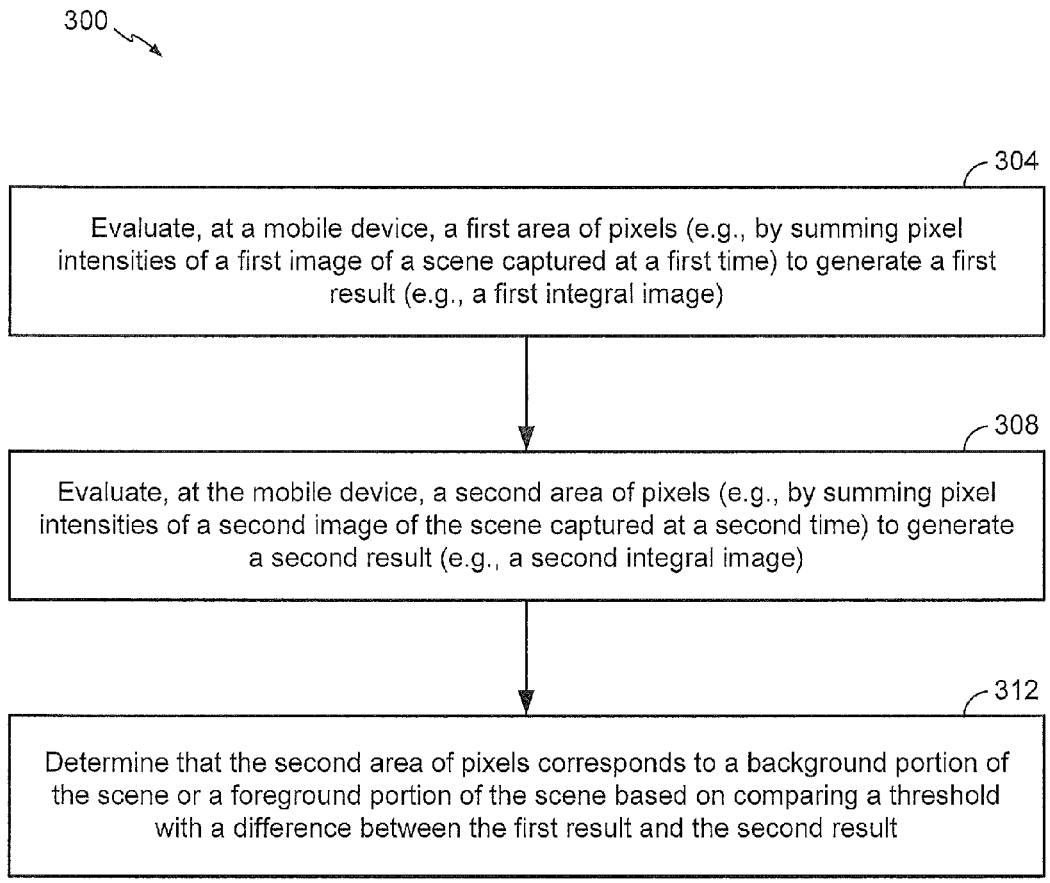
FIG. 3A is a flow diagram of a particular embodiment of a method of operation of the mobile device of one or more of FIGS. 1 and 2A-2C, or a combination thereof.

Referring to FIG. 3A, a particular illustrative embodiment of a method of operation of the mobile device 104 of one or more of FIGS. 1, 2A, 2B, and 2C is depicted and generally designated 300. The method 300 includes evaluating, at the mobile device 104, a first area of pixels (e.g., the first area of pixels 112) to generate a first result (e.g., the first result 122), at 304. The method 300 further includes evaluating, at the mobile device, a second area of pixels (e.g., the second area of pixels 114) to generate a second result (e.g., the second result 124), at 308.

At 312, based on comparing a threshold with a difference between the first result and the second result (e.g., a difference determined by the comparison circuit 130), a determination is made that the second area of pixels corresponds to a background portion of a scene (e.g., the background object 160 of the scene 108) or a foreground portion of the scene (e.g., the foreground object 170 of the scene 108). In at least one embodiment, the determination is made based on whether the difference exceeds or does not exceed a threshold.

Figure 3B:
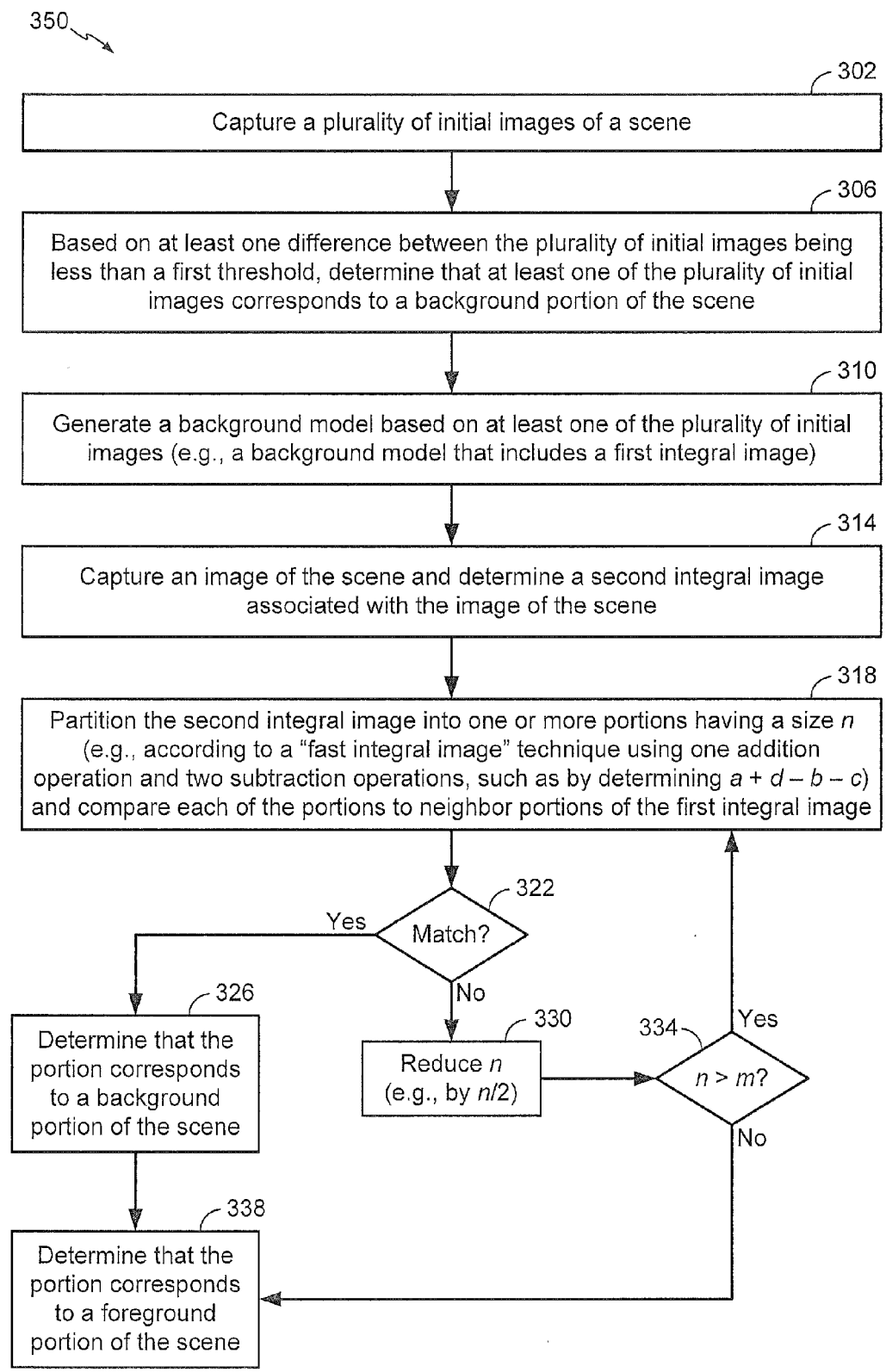
FIG. 3B is a flow diagram of another particular embodiment of a method of operation of the mobile device of one or more of FIGS. 1 and 2A-2C, or a combination thereof.

Referring to FIG. 3B, another particular illustrative embodiment of a method of operation of the mobile device 104 of one or more of FIGS. 1, 2A, 2B, and 2C is depicted and generally designated 350. The method 350 includes capturing a plurality of initial images of a scene, at 302. The initial images may include the areas of pixels 112, 114. The scene may be the scene 108. The initial images may be captured by the camera 110.

At 306, based on at least one difference between the plurality of initial images not exceeding a first threshold, a determination is made that at least one of the plurality of initial images corresponds to a background portion of the scene. For example, a determination may be made that the plurality of initial images corresponds to a "stable" image (e.g., a background portion of an image, such as the background object 160). In at least one embodiment, the comparison circuit 130 determines that the at least one difference does not exceed the first threshold using one or more techniques described with reference to FIG. 2A.

At 310, a background model (e.g., the background model 212) is generated based on at least one of the plurality of initial images. The background model may include a first integral image associated with the scene. According to further embodiments, the background model may be generated according to user input, as described further with reference to FIG. 8.

The method 350 further includes capturing (e.g., by the camera 110) a second image associated with the scene and determining a second integral image associated with the second image, at 314. The second integral image may be any of the results 122B, 124B, and 122C described with reference to FIGS. 2B and 2C.

At 318, the second integral image is partitioned (e.g., divided) into one or more portions having a size n and each of the one or more portions is compared to neighbor portions (e.g., portions within a predetermined range) of the first integral image. The size n may be a length (e.g., number of columns) of the one or more portions, a height (e.g., a number of rows) of the one or more portions, or a combination thereof. As an illustrative, non-limiting example, if the second integral image is a four-by-four matrix, then the second integral image may be partitioned into one or more two-by-two portions. In at least one embodiment, the second integral image is partitioned according to the "fast integral image" technique described with reference to FIG. 2C. For example, the one or more portions may be the "sub-integral images" described with reference to FIG. 2C and may be each generated using one addition operation and two subtraction operations, such as according to a+d−b−c, as described with reference to FIG. 2C.

At 322, a determination is made whether any of the one or more portions "matches" the first integral image. The determination may be made according to one or more techniques described with reference to FIGS. 1 and 2A-2C, such as by comparing the one or more portions to a second threshold to generate a second difference and determining whether the second difference exceeds a second threshold. If any of the one or more portions matches the first integral image, then a determination may be made that the portion corresponds to a background portion of the scene (e.g., corresponds to the background object 160, or a portion thereof, of the scene 108).

If none of the one or more portions matches the background model, then n may be reduced, at 330, and the second integral image may be re-partitioned, at 318. That is, smaller (e.g., "finer") portions of the second integral image may be generated and compared to neighbor portions of the first integral image. In at least one embodiment, the first integral image may be partitioned according to the "fast integral image" technique to generate the neighbor portions. In the particular embodiment of FIG. 3B, if a match cannot be determined between portions of the first and second integral images and n has been reduced to a predetermined floor value in (e.g., m=1), at 334, then the second integral image may be determined to correspond to a foreground portion of the scene (e.g., corresponds to the foreground object 170, or a portion thereof, of the scene 108), at 338.

Although for convenience of illustration the foregoing partitioning techniques have been described in terms of "symmetrical" partitioning (e.g., partitioning a four-by-four matrix into four two-by-two portions), in at least some applications integral images may be partitioned "non-symmetrically" (e.g., where a "remainder" portion has a size that is different than the size n of one or more other portions). It should be appreciated that such a "remainder" portion may be "matched" against a background model according to the techniques described with reference to FIG. 3B.

Figure 4:
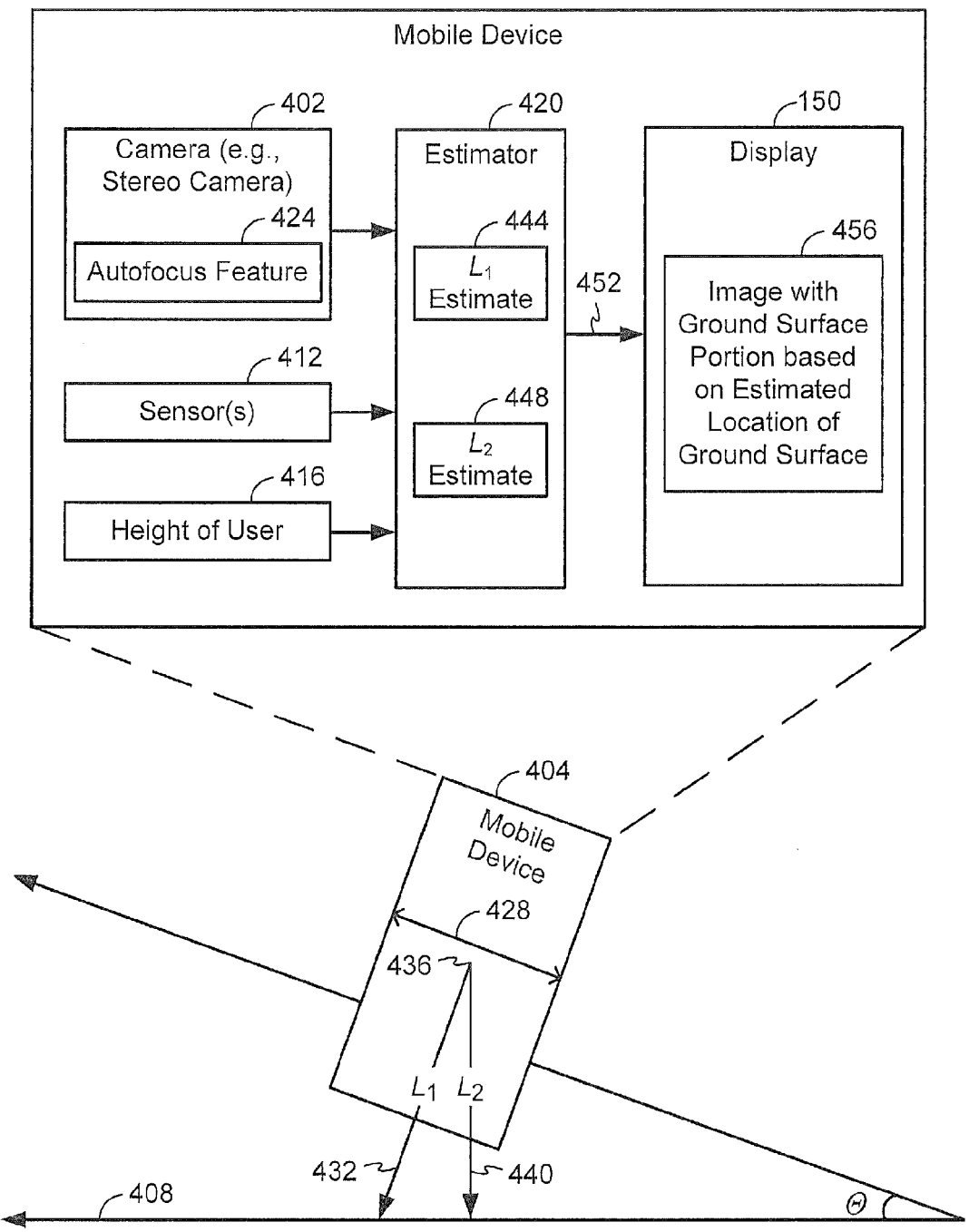
FIG. 4 is a block diagram of a particular embodiment of a mobile device to estimate a location of a ground surface.

FIG. 4 depicts a particular illustrative embodiment of a mobile device 404 configured to estimate a location of a ground surface 408. The mobile device 404 may be the mobile device 104 of one or more of FIGS. 1 and 2A-2C (or another mobile device). The mobile device 404 may include a display, such as the display 150 of FIGS. 1 and 2A-2C. The mobile device 404 may further include a camera 402 (e.g., a stereo camera), a sensor 412, an indication 416 of a height of a user of the mobile device 404, and an estimator 420. In at least one embodiment, the camera 402 is the camera 110 described with reference to FIG. 1. The camera 402 may include an autofocus feature 424 (e.g., logic to cause the camera 402 to automatically focus on objects within a field of view of the camera 402). The sensor 412 may be a sensor configured to detect position and/or motion of the mobile device 404, such as a gyroscope, an accelerometer, a motion sensor, or a combination thereof. As shown in the example of FIG. 4, a longitudinal extent 428 of the mobile device 404 may be positioned according to an angle θ relative to the ground surface 408 (e.g., while the mobile device 404 is being handled by the user).

In operation, the sensor 412 may determine the angle θ of the longitudinal extent 428 relative to the ground surface 408. The estimator 420 may generate a first estimate 444 of a first distance $L_1$ associated with a first projection 432 from a center 436 of the mobile device 404 (or from a center of the camera 402) to the ground surface 408. The first projection 432 is perpendicular to the longitudinal extent 428. The first estimate 444 may be generated using stereo camera data provided by the camera 402 of the mobile device 404, using the autofocus feature 424 of the mobile device, or a combination thereof.

The estimator 420 may further generate, based on the angle θ and the first estimate 444, a second estimate 448 of a second distance $L_2$ associated with a second projection 440 from the center 436 of the mobile device 404 to the ground surface 408. The second projection 440 is perpendicular to the ground surface 408. In at least one embodiment, the estimator 420 generates the second estimate 448 according to $L_2=L_1(\cos(\theta))$. Alternatively or in addition, the estimator 420 may generate the second estimate 448 based on the indication 416 of the height of the user of the mobile device 404, and the first estimate 444 may be determined based on the second estimate 448. For example, for a mobile device that does not include a stereo camera (not shown in FIG. 4), the second estimate 448 may be generated based on the indication 416 of the height of the user of the mobile device 404 and the first estimate 444 may be determined according to $L_2/(\cos(\theta))$.

The estimator 420 may generate an estimated location 452 of the ground surface 408. The display 150 may be responsive to the estimated location 452 and may display an image 456 that includes a ground surface portion that is based on the estimated location 452 of the ground surface 408.

It will be appreciated that the techniques described with reference to FIG. 4 may enable generation of the estimated location 452 of the ground surface 408 without utilizing a marker. For example, generating the second estimate 448 according to $L_2=L_1(\cos(\theta))$ may be performed without use of a marker. Hence, operation of augmented reality applications may be simplified and made more convenient for users of the mobile device 404.

Figure 5:
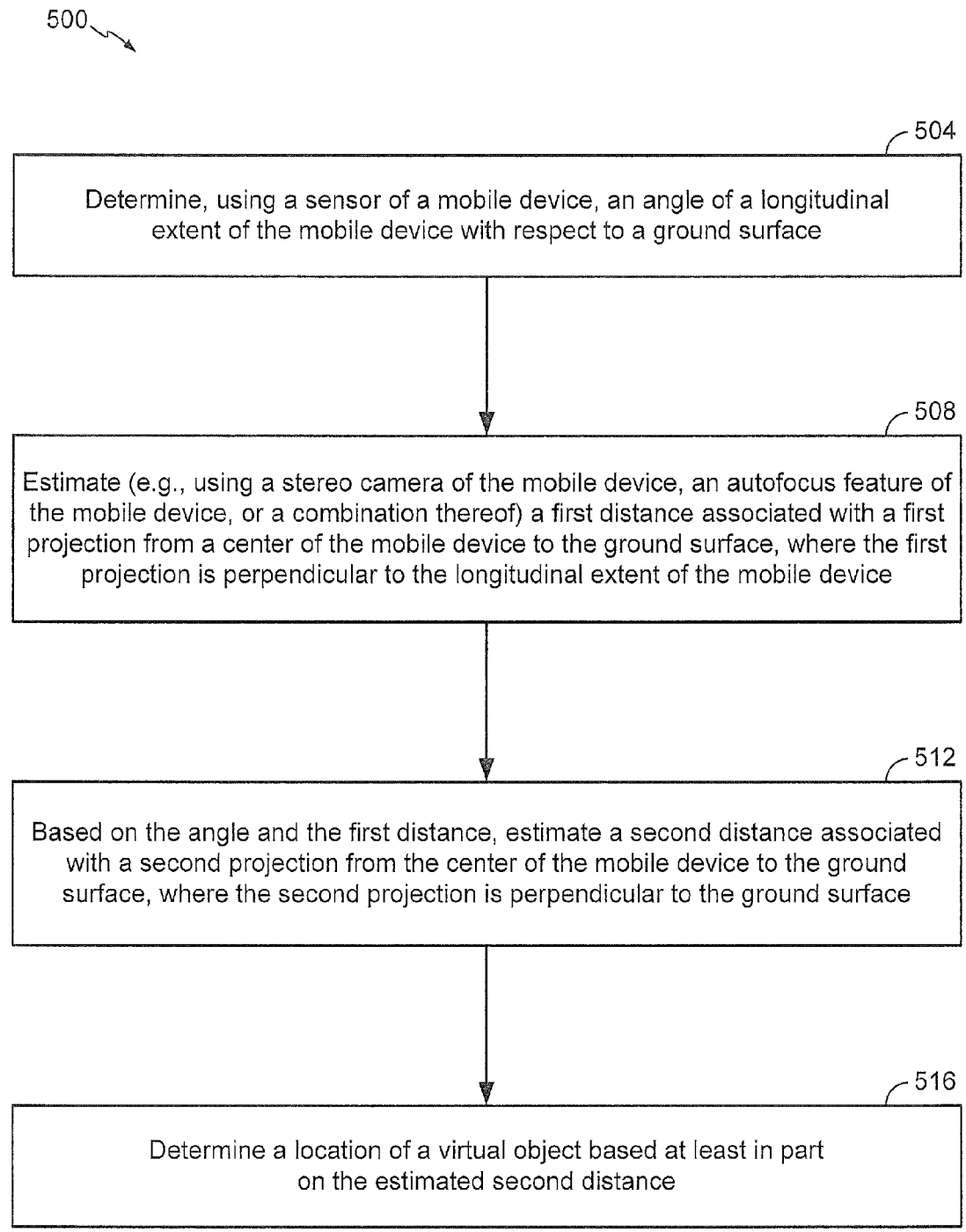
FIG. 5 is a flow diagram of a particular embodiment of a method of operation of the mobile device of one or more of FIGS. 1, 2A-2C, and 4, or a combination thereof.

Referring to FIG. 5, a flow diagram of a method of operation of the mobile device 404 of FIG. 4 is depicted and generally designated 500. The method 500 includes determining, using a sensor (e.g., the sensor 412) of the mobile device, an angle (e.g., the angle θ) of a longitudinal extent (e.g., the longitudinal extent 428) of the mobile device (e.g., the mobile device 404) with respect to a ground surface (e.g., the ground surface 408), at 504.

The method 500 further includes estimating a first distance (e.g., the first distance $L_1$) associated with a first projection (e.g., the first projection 432) from a center (e.g., the center 436) of the mobile device to the ground surface, at 508. The first projection is perpendicular to the longitudinal extent of the mobile device. The first distance may be estimated using a stereo camera of the mobile device, an autofocus feature (e.g., the autofocus feature 424) of the mobile device, or a combination thereof.

Based on the angle and the first distance, a second distance (e.g., the second distance $L_2$) is estimated, at 512. The second distance is associated with a second projection (e.g., the second projection 440) from the center of the mobile device to the ground surface. The second projection is perpendicular to the ground surface. The method 500 may further include determining a location of a virtual object based at least in part on the estimated second distance, at 516. For example, based on distance and location of the ground surface, the virtual object can be rendered as being on the ground (e.g., a ball at rest) or as being above the ground (e.g., the ball after being kicked).

Figure 6:
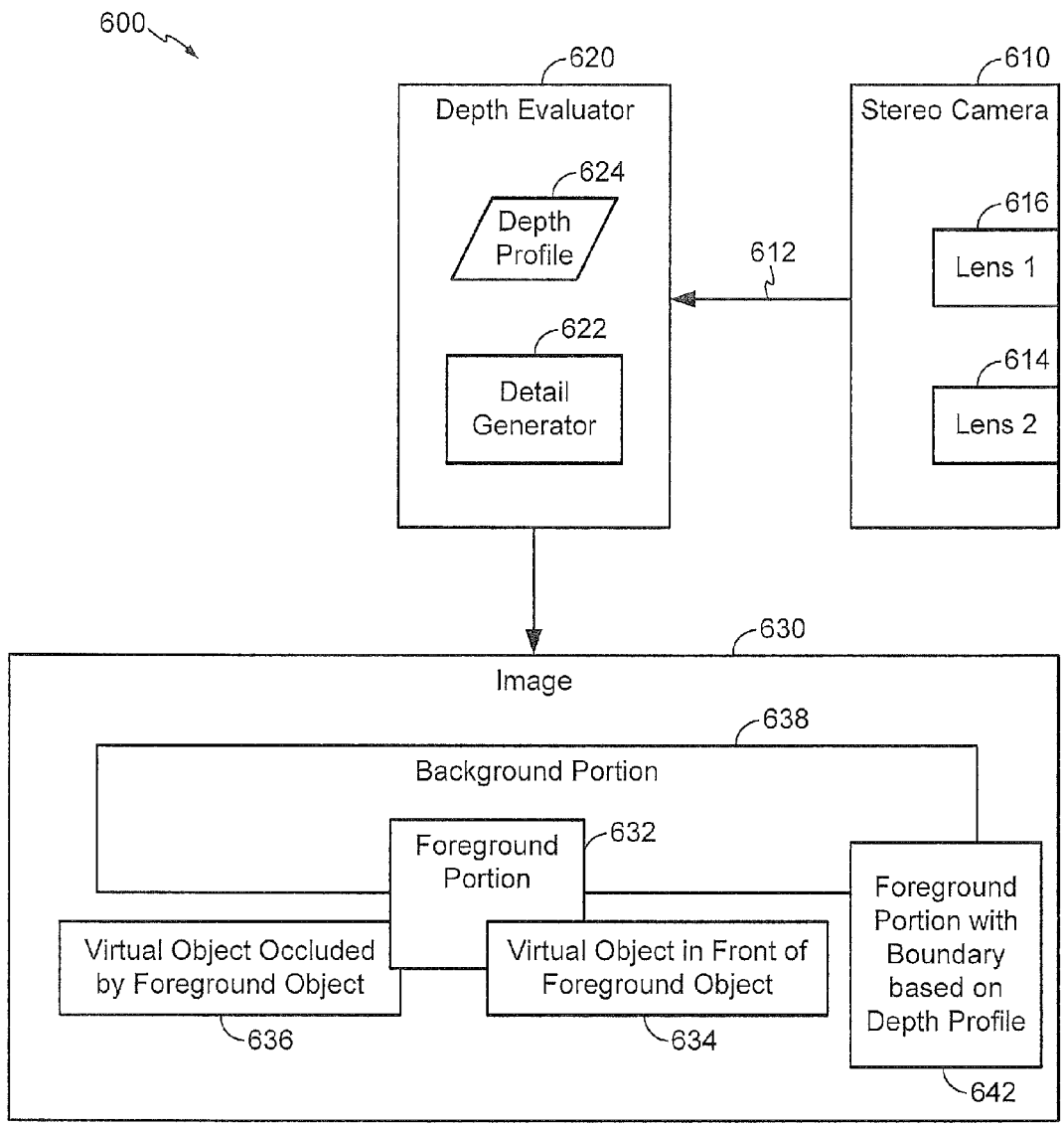
FIG. 6 is a block diagram of a particular embodiment of a mobile device to generate an image based on a depth profile associated with stereo camera data.

Referring to FIG. 6, a particular embodiment of a mobile device configured to generate images based on stereo camera depth data is depicted and generally designated 600. The mobile device 600 may include a stereo camera 610 and a depth evaluator 620 coupled to the stereo camera 610. The stereo camera 610 may include multiple lenses, such as a first lens 616 and a second lens 614. The depth evaluator 620 may include a detail generator 622. It should be appreciated that one or more features and operations of the mobile device 600 of FIG. 6 may be described with reference to the features and operations described with reference to FIGS. 1-5. For example, although not shown in FIG. 6 for clarity of illustration, the mobile device 600 may include the display 150 of FIGS. 1, 2A-2C, and 4.

In operation, the stereo camera 610 may generate image depth data 612 related to a scene (e.g., the scene 108 of FIG. 1). The image depth data 612 may indicate object depths. The depth evaluator 620 may be responsive to the image depth data 612 to generate a depth profile 624. The depth profile 624 may include depth information related to one or more images (e.g., related to one or more of the areas of pixels 112, 114 of FIG. 1). In at least one embodiment, the depth evaluator 620 is configured to determine, based on the depth profile 624, whether a foreground portion 632 is to be rendered in front of or behind virtual objects. For example, as shown in FIG. 6, the depth evaluator 620 may determine, based on the depth profile 624, that a virtual object 634 is to be rendered in front of the foreground portion 632. As another example, the depth evaluator 620 may determine, based on the depth profile 624, that a virtual object 636 is to be occluded by the foreground portion 632.

In at least one embodiment, the detail generator 622 may be configured to increase or decrease resolution of objects in the image 630 based on the depth profile 624. For example, in response to the depth profile indicating that an object has a large depth relative to the mobile device 600, the detail generator 622 may determine that the object corresponds to image background and is to be rendered as a background portion 638. As another example, in response to the depth profile indicating that the object has a small depth relative to the mobile device 600, the detail generator 622 may determine that the object corresponds to image foreground and is to be rendered as a foreground portion 642. In at least one embodiment and as described further with reference to FIG. 7, a boundary of the foreground portion 642 (e.g., a boundary of the foreground portion 642 relative to the background portion 638) may be determined based on the depth profile 624. In addition, and as described further with reference to FIG. 7, resolution of a portion of the image 630 (e.g., a portion corresponding to the boundary of the foreground portion 642) may be increased in response to determining the boundary of the foreground portion 642 based on the depth profile 624.

It will be appreciated that the techniques described in connection with FIG. 6 enable efficient generation of depth information. For example, in the example of FIG. 6, use of the stereo camera 610 may enable generation of depth information without analyzing a location and position of a marker. Further, as described further with reference to FIG. 7, the depth information can be used to selectively change image resolution and quality. That is, as described further with reference to FIG. 7, once a boundary of a foreground object of an image has been determined (e.g., using the stereo camera 610), portions outside the foreground object can be reduced in resolution and portions within the boundary can be increased in resolution. Thus, in at least one embodiment, additional processing resources can be allocated to portions of more interest (e.g., foreground portions) rather than to other portions (e.g., background portions).

Figure 7:
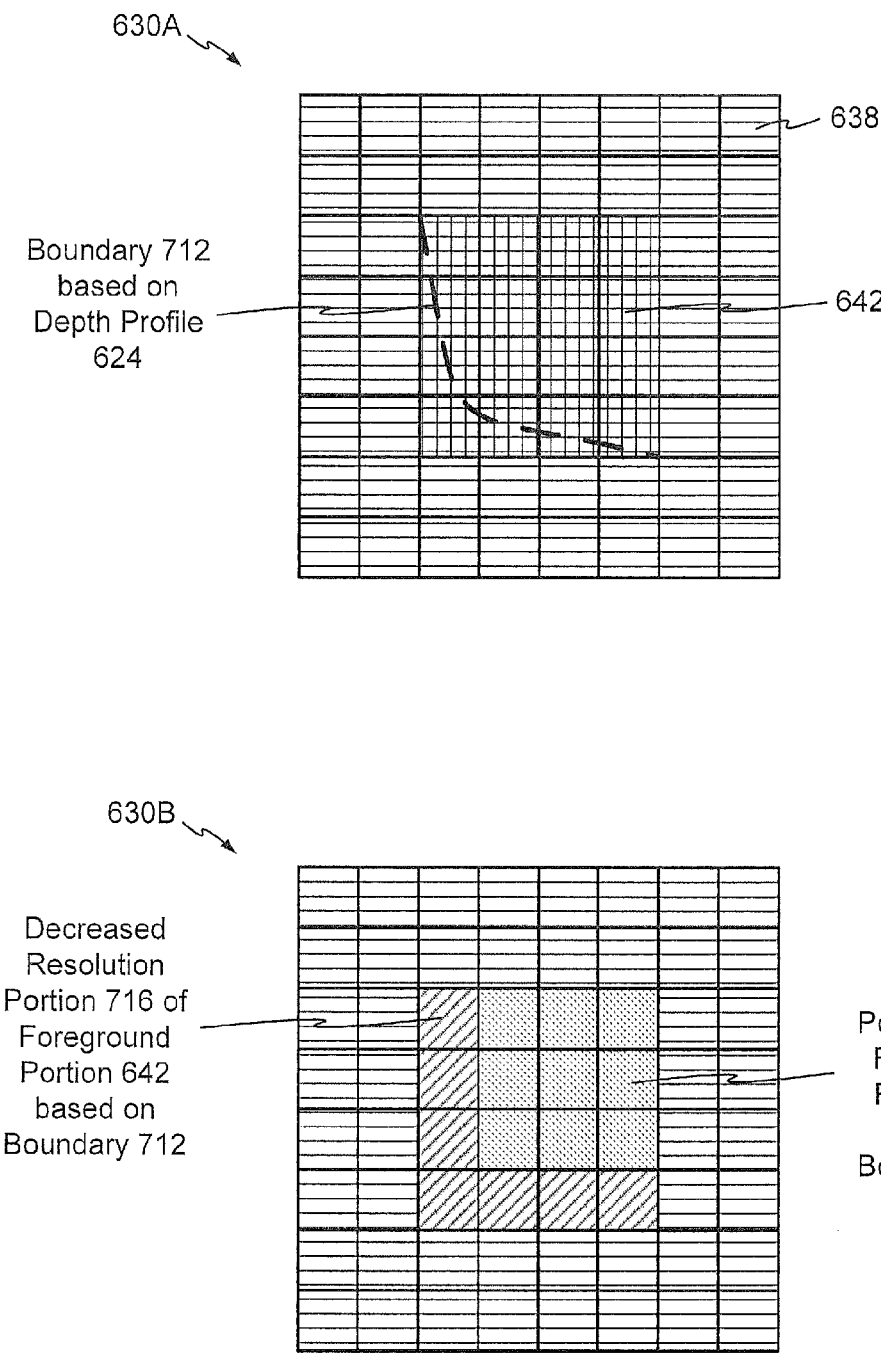
FIG. 7 is a block diagram of a particular example illustrating increasing resolution of a portion of the image of FIG. 6 based on the stereo camera data.

Referring to FIG. 7, a portion of the image 630 of FIG. 6 prior to and subsequent to selectively changing image resolution based on the depth profile 624 is depicted and generally designated 630A and 630B, respectively. As shown in FIG. 7, the portion 630A includes the background portion 638 and the foreground portion 642. The foreground portion 642 includes a boundary 712. The boundary 712 may be determined based on the depth profile 624. In at least one embodiment, the boundary 712 is determined based on a depth difference between the foreground portion 642 and the background portion 638 exceeding a threshold.

In response to determining the boundary 712, resolution of the foreground portion 642 may be selectively changed. For example, a first portion 716 of the foreground portion 642 may be decreased in resolution, or reclassified as a background portion, based on the boundary 712. A second portion 720 of the foreground portion 642 may be increased in resolution based on the boundary 712. For example, in at least one embodiment, the second portion 720 is improved from a block-based resolution to a pixel-based resolution (e.g., from coarse resolution to fine resolution). In at least one embodiment, one or more low resolution image portions are generated based on a high-level integral image stored at the storage device 216, as described with reference to FIG. 2C. Accordingly, selectively changing resolution of the foreground portion 642 based on the boundary 712 may improve contrast of the foreground portion 642 relative to the background portion 638, thus improving image quality.

Figure 8:
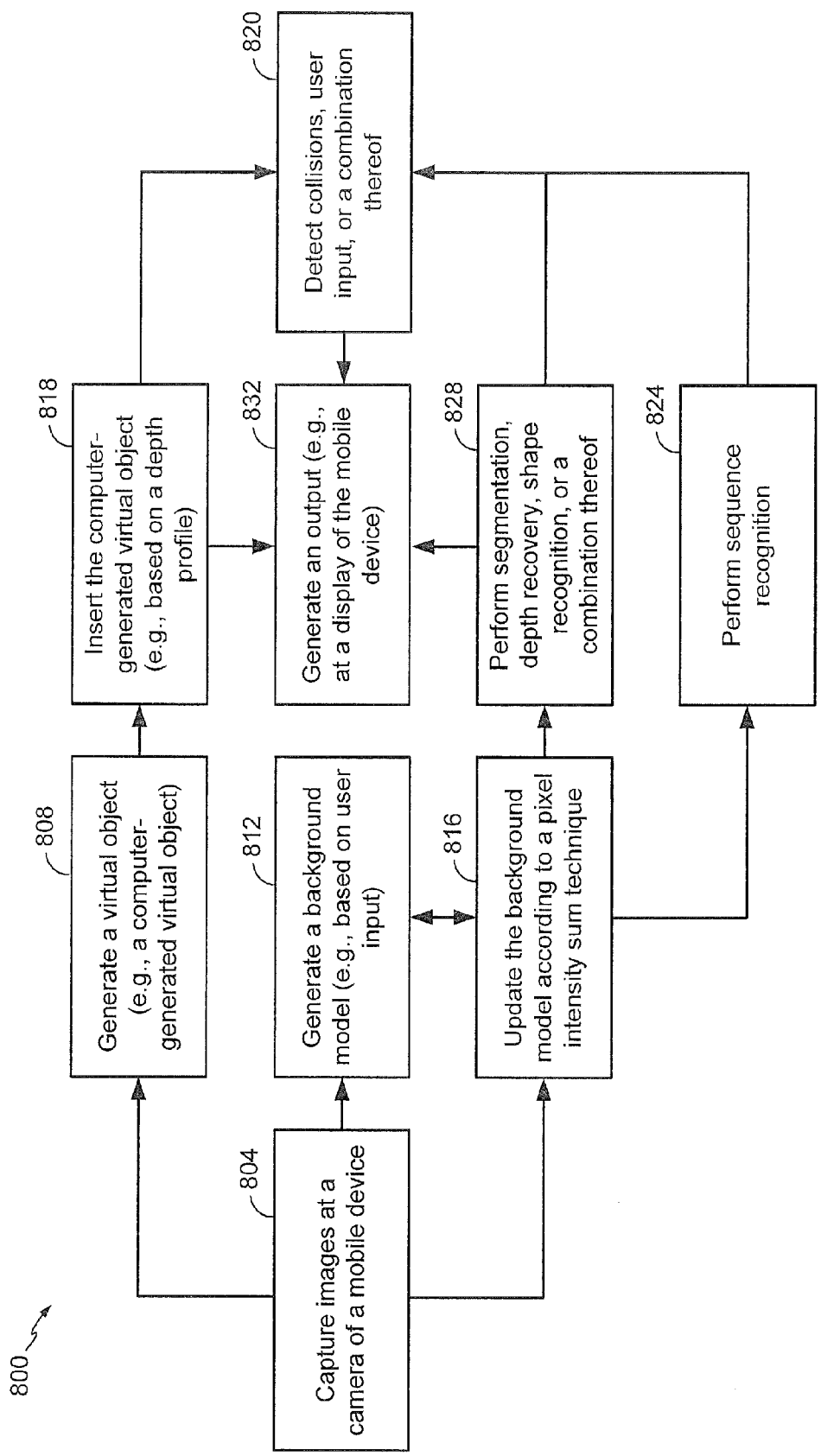
FIG. 8 is a flow diagram of a particular embodiment of a method of operation of a mobile device, such as the mobile device of one or more of FIGS. 1, 2A-2C, 4, and 6, or a combination thereof.

Referring to FIG. 8, an example operation of a mobile device is depicted and generally designated 800. The operations 800 may be performed by the mobile device 104 of one or more of FIGS. 1 and 2A-2C, the mobile device 404 of FIG. 4, the mobile device 600 of FIG. 6, or a combination thereof.

For example, images may be captured at a camera of the mobile device, at 804. The camera may be the camera 110 of one or more of FIGS. 1 and 2A-2C, the camera 402 of FIG. 4, the stereo camera 610 of FIG. 6, or a combination thereof. The images may correspond to the areas of pixels 112, 114.

The operations 800 further include generating a virtual object, at 808. The virtual object may be the virtual object 634 of FIG. 6, the virtual object 636 of FIG. 6, or a combination thereof. The virtual object may be a computer-generated virtual object that is generated using a processor of the mobile device, as described further with reference to FIG. 9.

The operations 800 further include generating a background model of an image to be displayed, at 812. In at least one embodiment, the background model is generated based on user input. For example, according to a particular example, a user may point the camera 110 at a background object (e.g., the background object 108) to designate the background model, for example in connection with an augmented reality game. Such a background model may also be sent and received between mobile devices, for example in connection with the augmented reality game. The background model may include a ground surface portion generated according to the techniques described with reference to FIGS. 4 and 5. The background model may be generated prior to generating the first result 122 as described with reference to FIGS. 1 and 2A-2C.

At 816, the background model is updated according to a pixel intensity sum technique (e.g., the integral image technique described with reference to FIGS. 1-3). For example, the pixel intensity sum technique may be utilized to determine that data corresponds to a foreground portion (e.g., the foreground portion 632 of FIG. 6, the foreground portion 642 of FIG. 6, or a combination thereof) based on whether a difference exceeds a threshold.

The operations 800 further include inserting the virtual object into the image to be displayed, at 818. For example, the virtual object may be inserted in front of or behind the foreground portion based on the depth profile 624 of FIG. 6. The operations 800 further include detecting collisions, user input, or a combination thereof, at 820. For example, a collision between a foreground object (e.g., a user) and a location (e.g., the location 180 of FIG. 1) corresponding to a virtual object may be detected.

The operations 800 may further include performing sequence recognition, at 824, and performing segmentation, depth recovery, shape recognition, or a combination thereof, at 828. At 832, an output is generated. For example, an image (e.g., the image 152 of FIG. 1, the image 630 of FIG. 6, or a combination thereof) may be displayed at the display 150 of one or more of FIGS. 1, 2A-2C, and 4.

As will be appreciated, operating a mobile device based on the operations 800 of FIG. 8 may enable efficient processing of augmented reality applications. Further, the augmented reality applications may be processed without utilizing a marker, which may provide convenience and improved performance for users.

Referring to FIG. 9, a block diagram of a particular embodiment of a mobile device is depicted and generally designated 900. In the particular example of FIG. 9, the mobile device 900 includes a processor 910 (e.g., a digital signal processor) that includes the evaluator 120 of FIG. 1, the comparison circuit 130 of FIG. 1, the background/foreground analyzer 140 of FIG. 1, the estimator 420 of FIG. 4, and the depth evaluator 620 of FIG. 6. Each of the evaluator 120, the comparison circuit 130, the background/foreground analyzer 140, the estimator 420, and the depth evaluator 620 may include hardware, instructions executable by the processor 910, or a combination thereof.

FIG. 9 further depicts a memory 932 coupled to the processor 910. The memory 932 is a computer-readable non-transitory (e.g., tangible) medium configured to store instructions 954 and data 956. The instructions 954 may include image processing instructions, such as instructions executable by the processor 910 to perform one or more operations described with reference to FIGS. 1-8. The instructions 954 may include an augmented reality application (e.g., an application including instructions executable by the processor 910 to generate virtual objects). The data 956 may include the areas of pixels 112, 114 of one or more of FIGS. 1 and 2A-2C, the results 122, 124 of one or more of FIGS. 1 and 2A-2C, the depth profile 624 of FIGS. 6 and 7, or a combination thereof.

The mobile device 900 may include a display, such as the display 150 described with reference to one or more of FIGS. 1, 2A-2C, and 4. The mobile device 900 may further include a camera 946 coupled to a camera controller 990. The camera 946 may be the camera 110 of one or more of FIGS. 1 and 2A-2C, the camera 402 of FIG. 4, the stereo camera 610 of FIG. 6, or a combination thereof.

FIG. 9 also shows a display controller 926 that is coupled to the processor 910 and to the display 150. A coder/decoder (CODEC) 934 can also be coupled to the processor 910. A speaker 936 and a microphone 938 can be coupled to the CODEC 934. FIG. 9 further indicates that a wireless controller 940 can be coupled to the processor 910 and to transceiver 950. The transceiver 950 may be coupled to an antenna 942.

In a particular embodiment, the processor 910, the display controller 926, the camera controller 990, the memory 932, the CODEC 934, the wireless controller 940, and the transceiver 950 are included in a system-in-package or system-on-chip device 922. In a particular embodiment, an input device 930, a power supply 944, and a sensor (e.g., the sensor 412 of FIG. 4) are each coupled to the system-on-chip device 922. Moreover, in a particular embodiment, as illustrated in FIG. 9, the display 150, the input device 930, the speaker 936, the microphone 938, the antenna 942, the power supply 944, and the sensor 412 are external to the system-on-chip device 922. However, each of the display 150, the input device 930, the speaker 936, the microphone 938, the antenna 942, the power supply 944, and the sensor 412 can be coupled to a component of the system-on-chip device 922, such as an interface or a controller.

In conjunction with the disclosed embodiments, a mobile device is described that includes means for evaluating (e.g., the evaluator 120) a first area of pixels to generate a first result and further for evaluating a second area of pixels to generate a second result. The mobile device further includes means for determining (e.g., the background/foreground analyzer 140) that the second area of pixels corresponds to one of a background portion of a scene and a foreground portion of the scene based on comparing a threshold with a difference between the first result and the second result.

In conjunction with the disclosed embodiments, a mobile device is described that includes means for determining (e.g., the sensor 412) an angle (e.g., the angle θ) of a longitudinal extent (e.g., the longitudinal extent 428) of the mobile device with respect to a ground surface (e.g., the ground surface 408). The mobile device further includes means for estimating (e.g., the estimator 420) a first distance (e.g., the first distance $L_1$) and for estimating a second distance (e.g., the second distance $L_2$) based on the angle and the first distance. The first distance is associated with a first projection (e.g., the first projection 432) from a center (e.g., the center 436) of the mobile device to the ground surface, where the first projection is perpendicular to the longitudinal extent of the mobile device. The second distance is associated with a second projection (e.g., the second projection 440) from the center of the mobile device to the ground surface. The second projection is perpendicular to the ground surface.

Those of skill would further appreciate that the various illustrative logical blocks, configurations, modules, circuits, and algorithm steps described in connection with the embodiments disclosed herein may be implemented as electronic hardware, computer software, or combinations of both. Various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of storage medium known in the art. An exemplary non-transitory (e.g. tangible) storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A method comprising:
   evaluating, at a mobile device, a first area of pixels according to a summed area operation to generate a first result associated with summed pixel intensity values, the first area of pixels corresponding to a scene at a first time;
   evaluating, at the mobile device, a second area of pixels to generate a second result, the second area of pixels corresponding to the scene at a second time subsequent to the first time; and
   determining that the second area of pixels corresponds to one of a background portion of the scene or a foreground portion of the scene based on comparing a threshold with a difference between the first result and the second result.

2. The method of claim 1, wherein the first area of pixels and the second area of pixels are evaluated by summing the pixel intensity values, and wherein the scene includes a foreground object.

3. The method of claim 2, wherein the first result is a first integral image comprising a first table of pixel intensity value sums, and wherein the second result is a second integral image comprising a second table of pixel intensity value sums.

4. The method of claim 1, further comprising:
   generating, at the mobile device, a virtual object; and
   displaying an image of the scene on a display device of the mobile device,
   wherein the image includes the foreground portion, the background portion, and the virtual object.

5. The method of claim 4, wherein the virtual object is associated with an augmented reality application of the mobile device.

6. The method of claim 1, further comprising:
   estimating a location of a ground surface relative to the mobile device; and
   based on the estimated location of the ground surface, determining a location of a virtual object.

7. The method of claim 6, wherein estimating the location of the ground surface includes:
   determining, using a sensor of the mobile device, an angle of a longitudinal extent of the mobile device with respect to the ground surface;
   estimating a first distance associated with a first projection from a center of the mobile device to the ground surface, wherein the first projection is perpendicular to the longitudinal extent of the mobile device; and
   based on the angle and the first distance, estimating a second distance associated with a second projection from the center of the mobile device to the ground surface, wherein the second projection is perpendicular to the ground surface.

8. The method of claim 1, further comprising:
   prior to generating the first result, capturing a plurality of initial images; and
   generating an initial background model based on the plurality of initial images.

9. The method of claim 8, further comprising:
   partitioning the first result into a plurality of portions; and
   comparing the plurality of portions to the initial background model to determine whether any of the plurality of portions matches the initial background model.

10. The method of claim 9, wherein each of the plurality of portions is generated using one addition operation and two subtraction operations.

11. The method of claim 1, further comprising;
    generating a depth profile associated with the scene using a stereo camera of the mobile device; and
    determining a boundary of the foreground portion, the boundary determined based on the depth profile.

12. The method of claim 11, further comprising increasing resolution of at least some of the foreground portion in response to determining the depth profile.

13. The method of claim 1, wherein the scene includes the foreground portion and the background portion.

14. The method of claim 1, further comprising:
    determining, by the mobile device, the first area of pixels corresponding to a first region of the scene at the first time; and
    determining, by the mobile device, the second area of pixels corresponding to the first region of the scene at the second time.

15. The method of claim 1, wherein the first area of pixels is associated with a first image of the scene having a first orientation, and wherein the second area of pixels is associated with a second image of the scene having a second orientation, the first orientation different than the second orientation.

16. The method of claim 4, further comprising determining a motion of the virtual object independent of a marker, wherein the motion is determined based on a degree of change of pixel intensities in a region of an image.

17. The method of claim 1, wherein evaluating the first area of pixels according to the summed area operation includes, for each pixel of the first area, summing the pixel intensity values of each other pixel to the left of the pixel to generate the first result.

18. The method of claim 1, wherein evaluating the first area of pixels according to the summed area operation includes, for each pixel of the first area, summing the pixel intensity values of each other pixel above the pixel and to the left of the pixel to generate the first result.

19. A mobile device comprising:
    an evaluator configured to evaluate a first area of pixels according to a summed area operation to generate a first result associated with summed pixel intensity values and further configured to evaluate a second area of pixels to generate a second result, wherein the first area of pixels corresponds to a scene at a first time and the second area of pixels corresponds to the scene at a second time subsequent to the first time; and
    a processor configured to determine that the second area of pixels corresponds to one of a background portion of the scene or a foreground portion of the scene based on a comparison of a threshold with a difference between the first result and the second result.

20. The mobile device of claim 19, wherein the evaluator is further configured to sum the pixel intensity values of first pixels of the first area of pixels and to sum the pixel intensity values of second pixels of the second area of pixels.

21. The mobile device of claim 20, wherein the first result is a first integral image comprising a first table of pixel intensity value sums, and wherein the second result is a second integral image comprising a second table of pixel intensity value sums.

22. The mobile device of claim 19, further comprising a display configured to display an image that includes the foreground portion, the background portion, and a virtual object.

23. The mobile device of claim 22, wherein the virtual object is associated with an augmented reality application executed by the processor.

24. The mobile device of claim 19, further comprising:
a sensor configured to determine an angle of a longitudinal extent of the mobile device with respect to a ground surface; and
an estimator configured to estimate a first distance associated with a first projection from a center of the mobile device to the ground surface, wherein the first projection is perpendicular to the longitudinal extent of the mobile device and further configured to estimate, based on the angle and the first distance, a second distance associated with a second projection from the center of the mobile device to the ground surface, wherein the second projection is perpendicular to the ground surface.

25. The mobile device of claim 19, further comprising a camera configured to capture a plurality of initial images, wherein the processor is further configured to generate an initial background model based on the plurality of initial images.

26. The mobile device of claim 25, wherein the processor is further configured to partition the first result into a plurality of portions and to compare the plurality of portions to the initial background model to determine whether any of the plurality of portions matches the initial background model.

27. The mobile device of claim 26, wherein the processor is further configured to generate each of the plurality of portions using one addition operation and two subtraction operations.

28. The mobile device of claim 19, further comprising;
a stereo camera configured to generate depth data associated with the scene; and
a depth evaluator configured to determine a boundary of the foreground portion, the boundary determined based on the depth data.

29. The mobile device of claim 28, wherein the depth evaluator is further configured to increase resolution of at least some of the foreground portion in response to determining the depth data.

30. A mobile device comprising:
means for evaluating a first area of pixels according to a summed area operation to generate a first result associated with summed pixel intensity values and further for evaluating a second area of pixels to generate a second result, wherein the first area of pixels corresponds to a scene at a first time and the second area of pixels corresponds to the scene at a second time subsequent to the first time; and
means for determining that the second area of pixels corresponds to one of a background portion of the scene or a foreground portion of the scene based on a comparison of a threshold with a difference between the first result and the second result.

31. The mobile device of claim 30, wherein the evaluator is further configured to sum the pixel intensity values of first pixels of the first area of pixels and to sum the pixel intensity values of second pixels of the second area of pixels.

32. The mobile device of claim 31, wherein the first result is a first integral image comprising a first table of pixel intensity value sums, and wherein the second result is a second integral image comprising a second table of pixel intensity value sums.

33. The mobile device of claim 30, further comprising means for displaying an image that includes the foreground portion, the background portion, and a virtual object.

34. The mobile device of claim 33, wherein the virtual object is associated with an augmented reality application.

35. The mobile device of claim 30, further comprising:
means for determining an angle of a longitudinal extent of the mobile device with respect to a ground surface; and
means for estimating a first distance associated with a first projection from a center of the mobile device to the ground surface, wherein the first projection is perpendicular to the longitudinal extent of the mobile device and further configured to estimate, based on the angle and the first distance, a second distance associated with a second projection from the center of the mobile device to the ground surface, wherein the second projection is perpendicular to the ground surface.

36. The mobile device of claim 30, further comprising means for capturing a plurality of initial images, wherein the means for determining is configured to generate an initial background model based on the plurality of initial images.

37. The mobile device of claim 36, wherein the means for determining is further configured to partition the first result into a plurality of portions and to compare the plurality of portions to the initial background model to determine whether any of the plurality of portions matches the initial background model.

38. The mobile device of claim 37, wherein the means for determining is further configured to generate each of the plurality of portions using one addition operation and two subtraction operations.

39. The mobile device of claim 30, further comprising:
means for generating depth data associated with the scene; and
means for determining a boundary of the foreground portion, the boundary determined based on the depth data.

40. The mobile device of claim 39, wherein the means for determining further configured to increase resolution of at least some of the foreground portion in response to determining the depth data.

41. A computer-readable non-transitory medium storing instructions executable by a processor o cause the processor to:
evaluate, at a mobile device, a first area of pixels according to a summed area operation to generate a first result associated with summed pixel intensity values, the first area of pixels corresponding to a scene at a first time;
evaluate, at the mobile device, a second area of pixels to generate a second result, the second area of pixels corresponding to the scene at a second time subsequent to the first time; and
determine that the second area of pixels corresponds to one of a background portion of the scene or a foreground portion of the scene based on comparing a threshold with a difference between the first result and the second result.

42. The computer-readable non-transitory medium of claim 41, wherein the first area of pixels and the second area of pixels are evaluated by summing the pixel intensity values.

43. The computer-readable non-transitory medium of claim 42, wherein the first result is a first integral image comprising a first table of pixel intensity value sums, and wherein the second result is a second integral image comprising a second table of pixel intensity value sums.

44. The computer-readable non-transitory medium of claim 41, wherein the instructions, when executed by the processor, further cause the processor to:
generate a virtual object; and
display an image of the scene on a display device of the mobile device,
wherein the image includes the foreground portion, the background portion, and the virtual object.

45. The computer-readable non-transitory medium of claim 44, wherein the virtual object is associated with an augmented reality application of the mobile device.

46. The computer-readable non-transitory medium of claim 41, wherein the instructions, when executed by the processor, further cause the processor to:
estimate a location of a ground surface relative to the mobile device; and
based on the estimated location of the ground surface, determine a location of a virtual object.

47. The computer-readable non-transitory medium of claim 46, wherein estimating the location of the ground surface includes:
determining, using a sensor of the mobile device, an angle of a longitudinal extent of the mobile device with respect to the ground surface;
estimating a first distance associated with a first projection from a center of the mobile device to the ground surface, wherein the first projection is perpendicular to the longitudinal extent of the mobile device; and
based on the angle and the first distance, estimating a second distance associated with a second projection from the center of the mobile device to the ground surface,
wherein the second projection is perpendicular to the ground surface.

48. The computer-readable non-transitory medium of claim 41, wherein the instructions, when executed by the processor, further cause the processor to:
prior to generating the first result, capture a plurality of initial images; and
generate an initial background model based on the plurality of initial images.

49. The computer-readable non-transitory medium of claim 48, wherein the instructions, when executed by the processor, further cause the processor to:
partition the first result into a plurality of portions; and
compare the plurality of portions to the initial background model to determine whether any of the plurality of portions matches the initial background model.

50. The computer-readable non-transitory medium of claim 49, wherein each of the plurality of portions is generated using one addition operation and two subtraction operations.

51. The computer-readable non-transitory medium of claim 41, wherein the instructions, when executed by the processor, further cause the processor to:
generate a depth profile associated with the scene using a stereo camera of the mobile device; and
determine a boundary of the foreground portion, the boundary determined based on the depth profile.

52. The computer-readable non-transitory medium of claim 51, wherein the instructions, when executed by the processor, further cause the processor to increase resolution of at least some of the foreground portion based on the depth profile.

* * * * *